United States Patent [19]

Rawlings

[11] 4,192,413
[45] Mar. 11, 1980

[54] DRIVEN PLATES FOR FRICTION CLUTCHES

[75] Inventor: Dennis G. Rawlings, Leamington Spa, England

[73] Assignee: Automotive Products Limited, Leamington Spa, England

[21] Appl. No.: 906,641

[22] Filed: May 16, 1978

Related U.S. Application Data

[63] Continuation of Ser. No. 747,907, Dec. 6, 1976, abandoned.

[30] Foreign Application Priority Data

Oct. 12, 1975 [GB] United Kingdom ............... 50701/75

[51] Int. Cl.$^2$ .............................................. F16D 3/14
[52] U.S. Cl. .................................................. 192/106.2
[58] Field of Search ............... 192/106.1, 106.2, 70.18; 64/15 C, 27 C

[56] References Cited

U.S. PATENT DOCUMENTS

| | | | |
|---|---|---|---|
| 1,975,772 | 10/1934 | Davis | 192/106.1 |
| 2,042,570 | 6/1936 | Wemp | 192/106.2 |
| 2,088,979 | 8/1937 | Stanley | 192/106.1 |
| 2,775,105 | 12/1956 | Banker | 192/106.1 |
| 3,375,911 | 4/1968 | Smirl | 192/106.1 |
| 3,938,635 | 2/1976 | Davies et al. | 192/106.2 |
| 3,995,726 | 12/1976 | DeGennes | 192/106.2 |
| 4,014,423 | 3/1977 | Werner et al. | 192/106.2 |

FOREIGN PATENT DOCUMENTS 1426885  3/1976  United Kingdom ................. 192/106.1

Primary Examiner—George H. Krizmanich
Attorney, Agent, or Firm—Kemon and Estabrook

[57] ABSTRACT

A friction clutch driven plate comprises an annular friction facing carrier which is mounted upon a hub assembly. Arcuate recesses are formed in the outer periphery of the hub assembly and receive rivets 32 which project from the carrier. Coil springs of square cross-section wire are supported eccentrically upon rivets, which are carried by the hub assembly, and have tangs at each end which both project outwardly between a respective pair of rivets which are carried by the hub assembly. Rotation of the hub assembly in either angular direction relative to the hub assembly is limited positively by abutment of the appropriate end of the arcuate recesses with the rivets which are received in those recesses. Those rivets deflect the trailing tang of each coil spring towards the other tang of that coil spring, which abuts the adjacent one of the rivets that are carried by the hub assembly, so that initial take up of drive through the friction clutch or torque reversal through the friction clutch, is cushioned by the coil springs.

12 Claims, 2 Drawing Figures

DRIVEN PLATES FOR FRICTION CLUTCHES

This is a continuation, of application Ser. No. 747,907, filed Dec. 6, 1976.

This invention relates to driven plates for friction clutches, the driven plates being of the kind which comprises an annular friction facing carrier which is mounted substantially coaxially upon a hub assembly for limited rotational motion relative to the hub assembly, and resilient means which act between the annular friction facing carrier and the hub assembly to oppose rotational motion of the annular friction facing carrier in either angular direction relative to the hub assembly. Such a driven plate will be referred to throughout this specification as a friction clutch driven plate of the kind referred to. Usually the resilient means tend to locate the annular friction facing carrier substantially at the centre of its range of rotational motion relative to the hub assembly.

Rotation of the annular friction facing carrier of a friction clutch driven plate of the kind referred to is transmitted to the hub assembly by the resilient means during the period of limited rotational motion of the carrier relative to the hub assembly. Usually stop means, which are carried by both the annular friction facing carrier and the hub assembly, interact positively to prevent further rotational motion of the annular friction facing carrier relative to the hub assembly at either end of the range of limited rotational motion of the annular friction facing carrier relative to the hub assembly. Hence torque is transmitted from the annular friction facing carrier to the hub assembly via the resilient means prior to the positive interaction of the stop means and as a shear load once the stop means interact positively to prevent rotational motion of the annular friction facing carrier relative to the hub assembly. Thus initial take up of the drive through a friction clutch which includes a friction clutch driven plate of the kind referred to, or torque reversal through such a clutch during driving is cushioned by the resilient means of the driven plate. It is desirable to provide a friction clutch driven plate of the kind referred to in which the resistance to rotational motion of the annular friction facing carrier relative to the hub assembly that is afforded by the resilient means increases progressively in an exponential manner as the annular friction facing carrier moves from the centre towards the respective end of its range of rotational movement relative to the hub assembly. An object of this invention is to provide a new form of friction clutch driven plate of the kind referred to which is capable of being assembled in a practical and commercially viable manner from readily available materials and which has operational characteristics that approximate to the desired characteristics set out above.

According to this invention there is provided a friction clutch driven plate of the kind referred to, wherein the resilient means comprise one or more pairs of linked finger elements which are located with respect to one of the annular friction facing carrier and the hub assembly, each finger element being linked to the other finger element of the respective pair by a respective resilient link, the annular friction facing carrier carries one pair of abutments for each pair of linked finger elements, and the hub assembly carries another pair of abutments for each pair of linked finger elements, both the linked finger elements of each pair extending between the respective pair of abutments that are carried by the annular friction facing carrier and between the respective abutments that are carried by the hub assembly and the resilient link of each pair opposing deflection of either finger element of that pair towards the other finger element of that pair so that, during rotational motion of said annular friction facing carrier in one angular direction, the trailing one of the or each pair of abutments that are carried by the annular friction facing carrier abuts the adjacent finger element of the respective pair of linked finger elements and deflects that finger element against the action of the respective resilient link, the other finger element of the or each pair being held against the adjacent one of the respective pair of abutments that are carried by the hub assembly.

Preferably each pair of linked finger elements comprise a pair of tangs at each end of a coil spring, the turn or turns of the coil spring comprising the respective resilient link. We have found that the operational characteristics of a friction clutch driven plate of the kind referred to in which this invention is embodied can approximate to the desired characteristics most closely if we provide several such pairs of linked finger elements which are arranged symmetrically about the hub assembly and if each pair of linked finger elements comprises a pair of tangs at each end of a coil spring which is formed from square cross section spring wire, the turn or turns of the coil spring comprising the respective resilient link.

The abutments that are carried by the annular friction facing carrier of the preferred form of friction clutch driven plate of the kind referred to in which this invention is embodied comprise rollers which are supported from the annular friction facing carrier each for rotation about a respective axis which is normal to a radially extending planar surface of the annular friction carrier.

Conveniently the hub assembly includes a tubular hub and an annular disc which is fixed to the tubular hub and which extends radially outwardly from the hub. The or each pair of linked finger elements conveniently are located between the annular friction facing carrier and the annular disc. Where there are several such pairs of linked finger elements which are arranged symmetrically about the tubular hub, each pair of linked finger elements conveniently is supported from the annular disc. Where each pair of linked finger elements comprise a pair of tangs at each end of a coil spring, they may be supported from the annular disc by a respective rivet which projects through the turns of the coil springs. Each such rivet may carry a tubular bush, which preferably is one of a pair of such tubular bushes which are arranged end to end on the respective rivet, and may be eccentric with respect to the turns of the coil spring, that part of the outer surface of the rivet, or the or each tubular bush that it carries, which is nearest to the axis of the tubular hub being in contact with the inner periphery of the turns of the respective coil spring and there being a clearance between the rivet, or the or each tubular bush that it carries, and the opposite peripheral surface portion of the turns of the respective coil spring. The abutments that are carried by the hub assembly may comprise rivets which are carried by the annular disc and which project from that annular disc, normal to a planar surface of it and towards the annular friction facing carrier. The outer periphery of the annular disc may form a circumferential array of substantially equi-angularly spaced radially-outwardly directed projections which each has radial edges at its sides, the pairs of adjacent radial edges of each adjacent pair of the radially-outwardly directed projections comprising stop surfaces which interact with respective stop members that project from the annular friction facing carrier into the recess that is formed between them to function as stop means which positively limit rotational motion of the annular friction facing carrier relative to the hub assembly. Where the abutments that are carried by the annular friction facing carrier comprise rollers which are supported from the annular friction facing carrier, each of those rollers may be journaled upon a respective one of the stop members that project from the annular friction facing carrier.

The abutments that are carried by the annular friction facing carrier and/or the abutments that are carried by the hub assembly may be profiled so that the torque/deflection characteristics of the clutch driven plate vary through the permitted range of angular movement of the annular friction facing carrier relative to the hub assembly.

Either the abutments carried by the annular friction facing carriers, the abutments carried by the hub assembly or the means for locating the pair or pairs of linked finger elements with respect to one of the annular friction facing carrier and the hub assembly are mounted so that they are movable radially outwardly under the action of centrifugal force so that the torque/deflection characteristics of the clutch driven plate vary with variations in the rotary speed of the clutch driven plate.

One embodiment of this invention will be described now by way of example with reference to the accompanying drawings of which:

Figure 1:
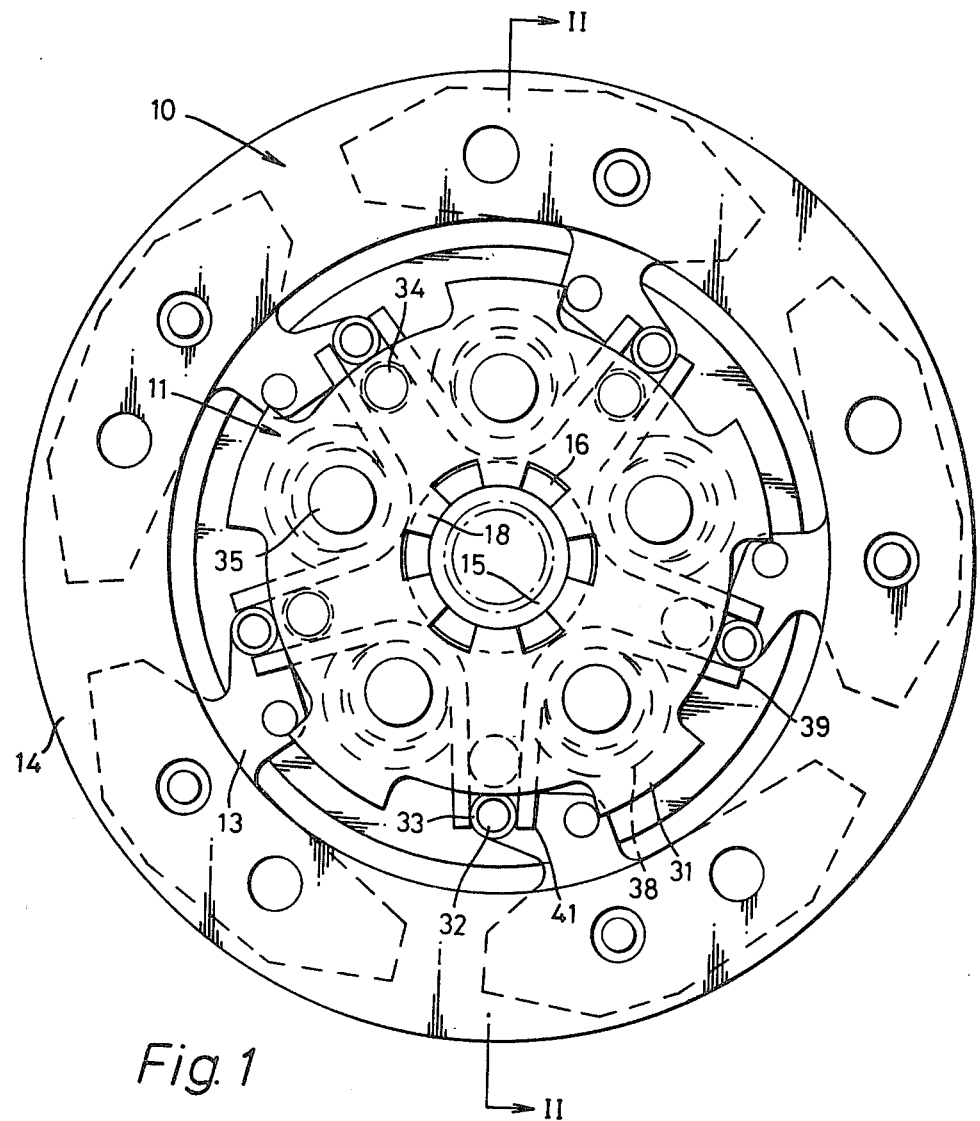
FIG. 1 is a front elevation of a friction clutch driven plate.
Figure 2:
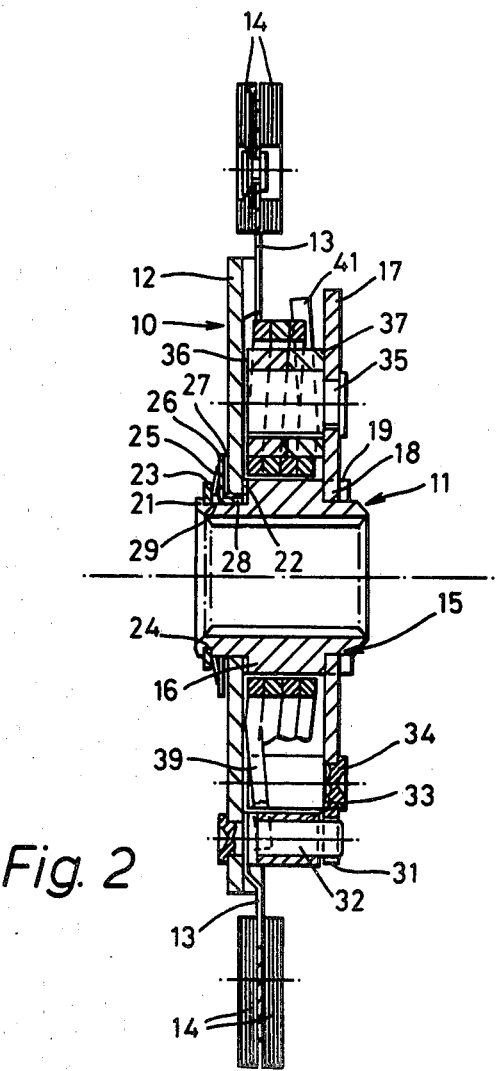
FIG. 2 is a section upon the line II—II of FIG. 1.

The friction clutch driven plate comprises an annular friction facing carrier 10 which is mounted substantially coaxially upon a hub assembly 11 for rotational motion relative to the hub assembly 11. The annular friction facing carrier 10 comprises a rigid annular disc 12, a series of resilient metal cushion members 13 which are rivetted to the rigid annular disc 12 at equi-angularly spaced points about its circumference, each by a respective pair of rivets, and which project radially outwardly from it. The series of resilient metal cushion members 13 support annular friction facings 14 in the conventional manner.

The hub assembly 11 comprises an internally splined tubular hub 15 which has an externally thickened portion 16 extending over a part of its length, and an annular disc 17 of sheet metal.

The radially inner periphery of the annular disc 17 forms a series of radially-inwardly projecting dogs 18 which are spaced apart equi-angularly. Each dog 18 is engaged within a respective one of a series of correspondingly-shaped notches 19 which are formed in the externally-thickened portion 16 of the tubular hub 15 at one of its ends. Each dog 18 may be a tight fit within the respective groove 19, or may be located within the respective groove 19 by deformation of those parts of the thickened portion 16 of the tubular hub 15 that extend between the dogs 18 and the adjacent end of the tubular hub 15, so that the annular disc 17 is fixed to the tubular hub 15.

The end portion 21 of the tubular hub 15 that is at the end of the hub 15 opposite that at which the grooves 19 are formed, has a smaller outside diameter than the thickened portion 16 and is spigotted into the central aperture of the rigid annular disc 12. The inner peripheral portion of the disc 12 is spaced from the adjacent end of the thickened hub portion 16 by a washer 22. A circlip 23 is fitted into a circumferential groove 24 which is formed in the outer cylindrical surface of the smaller diameter tubular hub portion 21 on the opposite side of the annular disc 12 from the washer 22. A Belleville washer 25 reacts against the circlip 23 and urges a pressure plate 26 towards the annular disc 12. A washer 27 is clamped between the pressure plate 26 and the annular disc 12 by the action of the Belleville washer 25. The pressure plate 26 has a tongue 28 which projects from its radially inner periphery and which extends parallel to the axis of the tubular hub 15. The tongue 28 is engaged within a corresponding groove 29 which is formed in the outer cylindrical surface of the smaller diameter end portion 21 of the tubular hub 15 so that it extends from the circumferential groove 24 towards the thickened hub portion 16 parallel to the axis of the tubular hub 15. The tongue 28 projects through the central aperture of the rigid annular disc 12. The pressure plate 26 is located against rotation relative to the tubular hub 15 by engagement of its tongue 28 in the groove 29.

The outer periphery of the annular disc 17 forms a circumferential array of substantially equi-angularly spaced radially-outwardly directed projections 31. Each projection 31 has radial edges at its sides. One, 32, of the two rivets by which each resilient metal cushion member 13 is fixed to the outer periphery of the rigid annular disc 12 projects through a respective one of the recesses that are formed by the outer periphery of the annular disc 17 between each adjacent pair of the projections 31. A tubular roller 33 is journaled upon the stem of each rivet 32. The end of the stem of each rivet 32 remote from the head of that rivet 32 projects beyond the end of the respective roller 33. The rivets 32 are equi-spaced from the axis of the tubular hub 21.

Another series of rivets 34 are carried by the rigid disc 17 so that the centre of each of those rivets 34 lies in the radial plane that passes through the centre of a respective one of the arcuate recesses that are formed between each adjacent pair of radially-outwardly directed projections 31. Each rivet 34 projects from the annular disc 17 towards the rigid annular disc 12, there being a clearance between its end and the adjacent planar face of the rigid annular disc 12. The outside diameter of each rivet 34 is greater than the outside diameter of each tubular roller 33. The rivets 34 are equi-spaced from the axis of the tubular hub 15 and the pitch circle diameter of the rivets 34 is less than the pitch circle diameter of the rivets 32.

A third series of rivets 35 are fixed to the annular disc 17 so that each rivet 35 projects towards the annular disc 12, there being a clearance between its end and the adjacent planar face of the rigid annular disc 12. Each rivet 35 is larger than the rivets 32 and 34 and has its centre in a respective one of the radial planes that extend through the centres of the radially outwardly directed projections 31. The rivets 35 are equi-spaced from the axis of the tubular hub 15, the pitch circle diameter of the larger rivets 35 being less than that of the other rivets 34 that are carried by the annular disc 17.

Each rivet 35 carries two tubular bushes 36 and 37 and projects through the centre of a respective one of a circumferential array of coil springs 38, the two bushes 36 and 37 that are carried by each rivet 35 being in end to end abutment. Each coil spring 38 is formed of square cross-section spring wire and has a tang 39, 41 at each end. Each of the largest rivets 35 is eccentric with respect to the respective coil spring 38, the radially innermost portion of the outer cylindrical surface of each of the two tubular bushes 36 and 37 that it carries being in contact with the inner surface of respective turns of the coil spring 38 and there being a clearance between the outermost portion of the cylindrical surface of both those tubular bushes 36 and 37 and the turns of the coil spring 38. The tangs 39 and 41 of each coil spring 38 project radially outwardly both between a respective pair of the rivets 34 that are carried by the annular disc 17 and between a respective pair of the rivets 32 that project from the annular friction facing carrier 10.

Conveniently there are five coil springs 38, five larger bushed rivets 35, five of the rivets 34 that are carried by the annular disc 17 and five of the rivets 32 that are carried by the annular friction facing carrier 10.

Each rivet 32 is located substantially at the centre of the respective recess that is formed by the outer periphery of the annular disc 17 when the clutch driven plate is not transmitting torque because the roller 33 that it carries is located between the tang 39 of one adjacent coil spring 38 and the tang 41 of the other adjacent coil spring 38. In this condition the various components of the clutch driven plate are arranged symmetrically. Each roller 33 is in contact with each of the two tangs 39 and 41 between which it is located substantially at the outer ends of those tangs 39 and 41. Also each rivet 34 is substantially in contact with the pair of tangs 39 and 41 between which it is located.

Initial rotational motion of the annular friction facing carrier 10 about the axis of the hub assembly 11 when torque is applied to it is relative to the hub assembly 11 so that each of the rivets 32 moves in one direction from its central position between a respective pair of the radially-outwardly directed projections 31 towards a respective one of those projections 31. Hence each of the rollers 33 that is carried by the rivets 32 leads one of the tangs 39 and 41 between which it is located and trails the other. Each roller 33 and the tang 39, 41 which it leads separate, that tang 39, 41 being in abutment with the respective relatively-fixed rivet 34, and that roller 33 deflects the tang 39, 41 that it trails. Hence such movement of each of the rollers 33 away from its central position is opposed by the resilient loading of the coil spring 38 that includes the tang 39, 41 that it trails. Moreover, as the distance between each roller 33 and the radially-outwardly directed projection 31 towards which it moves decreases, that roller 33 rolls along the outer edge of the tang 39, 41 that it trails. Hence the part of the surface of each tang 39, 41 with which the respective trailing roller 33 is in contact moves progressively inwards towards the centre of the respective coil spring 38. It follows that the shortest distance between the centre of each coil spring 38 and the line of action of the force that is applied to it through the respective roller 33 that trails its tang 39, 41 also reduces progressively with the result that the reaction load that is applied to each roller 33 through the tang 39, 41 that it follows increases progressively in an exponential manner so that the resilient load that acts to oppose rotational movement of the annular friction facing carrier 10 relative to the hub assembly 11 also increases progressively in an exponential manner. Angular motion of the annular friction facing carrier 10 relative to the hub assembly 11 continues until each rivet 32 abuts the radial edge of the respective radially-outwardly directed projection 31 towards which it is moved, the torque being transmitted to the hub assembly 11 via the coil springs 38. The torque is transmitted as a shear load through the rivets 32 when those rivets 32 abut the respective projections 31. Provision of the two tubular bushes 36 and 37 on each rivet 35 enables each tang 39, 41 to move about the centre of the respective coil spring 38 relative to the other with a minimum of scuffing.

Frictional damping of movement of the annular friction facing carrier 10 relative to the hub assembly 11 is proviced in the well known manner by the action of the Belleville washer 25 that acts through the pressure plate 26 and the washer 27. The action of centrifugal force which urges the coil springs 38 radially outwardly so that that centrifugal force is exerted by each coil spring 38 upon the respective pair of tubular bushes 36 and 37 also provide torsional frictional damping of movement of the annular friction facing carrier 10 relative to the hub assembly 11. Moreover the amount of such torsional frictional damping that is provided by the action of centrifugal force on the coil springs 38 increases with increasing rotary speed of the clutch driven plate.

The rivets 32 and/or the rivets 34 may be replaced by pins which project from either the rigid annular disc 12 or from the annular disc 17 in the manner of a cantilever and such pins provided may be profiled so that the torque/deflection characteristics of the clutch driven plate vary through the permitted range of angular movement of the annular friction facing carrier 10 relative to the hub assembly 11.

Either the rivets 32, the rivets 34 or the rivets 35, or the corresponding profiled cantilever pins may be mounted upon the respective rigid annular disc 12 or annular disc 17 so that they move radially outwardly relative to the respective discs 12, 17 under the action of centrifugal force so that the torque/deflection characteristics of the clutch driven plate vary with variations in rotary speed of the clutch driven plate.

I claim:

1. A friction clutch driven plate which comprises a hub assembly, an annular friction facing carrier which is mounted substantially coaxially upon the hub assembly for limited rotational motion relative to the hub assembly, and resilient means which act between the annular friction facing carrier and the hub assembly to oppose rotational motion of the annular friction facing carrier in either sense of the rotation relative to the hub assembly, the resilient means comprising at least one pair of linked finger elements which are located with respect to one of the annular friction facing carrier and the hub assembly, each finger element being linked to the other finger element of the respective pair by a respective resilient link, one pair of abutments for each of said at least one pair of linked finger elements which are carried by the annular friction facing carrier and another pair of abutments for each of said at least one pair of linked finger elements which are carried by the hub assembly, both the linked finger elements of each of said at least one pair extending between the respective pair of abutments that are carried by the hub assembly and between the respective pair of abutments that are carried by the annular friction facing carrier, and the resilient link of each of said at least one pair of linked finger elements opposing deflection of either finger element of that pair towards the other finger element of that pair so that, during rotational motion of said annular friction facing carrier in either sense of rotation, the trailing one of the at least one pair of abutments that are carried by the annular friction facing carrier abuts the adjacent finger element of the respective pair of linked finger elements and deflects that finger element against the action of the respective resilient link, the other finger element of the at least one pair being held against the adjacent one of the respective pair of abutments that are carried by the hub assembly, wherein the ends of the finger elements of the at least one pair that are remote from the respective resilient link are unrestricted so that the point of contact between the trailing one of the at least one pair of abutments that are carried by the annular friction facing carrier and the finger element it abuts moves toward the respective resilitent link as it deflects that finger element whereby the reaction load applied by the finger element to the abutment that abuts it increases exponentially as that finger element is deflected, each of said at least one pair of linked finger elements comprise a pair of tangs at each end of a coil spring, the turn or turns of the coil spring comprising the respective resilient link.

2. A friction clutch driven plate according to claim 1, including several such pairs of linked finger elements which are arranged symmetrically about the hub assembly, each pair of linked finger elements comprising a pair of tangs at each end of a respective coil spring, each coil spring being formed from square cross section spring wire.

3. A friction clutch driven plate according to claim 1, wherein each of said at least one pair of finger elements is supported from the hub assembly by a respective rivet which projects through the turns of the respective coil spring.

4. A friction clutch driven plate according to claim 3, wherein each such rivet carries a tubular bush.

5. A friction clutch driven plate according to claim 4, wherein the tubular bush that is carried by each such rivet is eccentric with respect to the turns of the respective coil spring.

6. A friction clutch driven plate according to claim 4, wherein that part of the outer surface of each tubular bush that is nearest to the axis of the hub assembly is in contact with the inner periphery of the turns of the respective coil spring and there is a clearance between that tubular bush and the opposite peripheral surface portion of the turns of the respective coil spring.

7. A friction clutch driven plate according to claim 3, wherein each such rivet carries a pair of such tubular bushes which are arranged end to end on the respective rivet.

8. A friction clutch driven plate according to claim 3, wherein that part of the outer surface of each such rivet which is nearest to the axis of the hub assembly is in contact with the inner periphery of the turns of the respective coil spring and there is a clearance between each such rivet and the opposite peripheral surface portion of the turns of the respective coil spring.

9. A friction clutch driven plate according to claim 1, wherein the abutments that are carried by the annular friction facing carrier comprise rollers which are supported from the annular friction facing carrier each for rotation about a respective axis which is normal to a radially extending planar surface of the annular friction carrier.

10. A friction clutch driven plate according to claim 1, in which the hub assembly includes a tubular hub and an annular disc which is fixed to the tubular hub, which extends radially outwardly from the tubular hub and which has a radially-extending planar surface, wherein the abutments that are carried by the hub assembly comprise rivets which are carried by the annular disc and which project from that annular disc, normal to its planar surface and towards the annular friction facing carrier.

11. A friction clutch driven plate according to claim 10, wherein the outer periphery of the annular disc forms a circumferential array of substantially equi-angularly spaced radially-outwardly directed projections which each has radial edges at its sides, the pairs of adjacent radial edges of each adjacent pair of the radially-outwardly directed projections comprising stop surfaces which interact with respective stop members that project from the annular friction facing carrier into the recess that is formed between them to function as stop means which positively limit rotational motion of the annular friction facing carrier relative to the hub assembly.

12. A friction clutch driven plate according to claim 11, in which the abutments that are carried by the annular friction facing carrier comprise rollers which are supported from the annular friction facing carrier each for rotation about a respective axis which is normal to a radially extending planar surface of the annular friction carrier, wherein each of the rollers that are supported from the annular friction facing carrier is journaled upon a respective one of the stop members that project from the annular friction facing carrier.

* * * * *